Nov. 8, 1949          J. W. WHITE          2,487,623
CAMERA COPY BOARD
Filed Jan. 29, 1947          2 Sheets-Sheet 1

INVENTOR
JAMES W. WHITE
BY
Morgan, Finnegan & Durham
ATTORNEYS

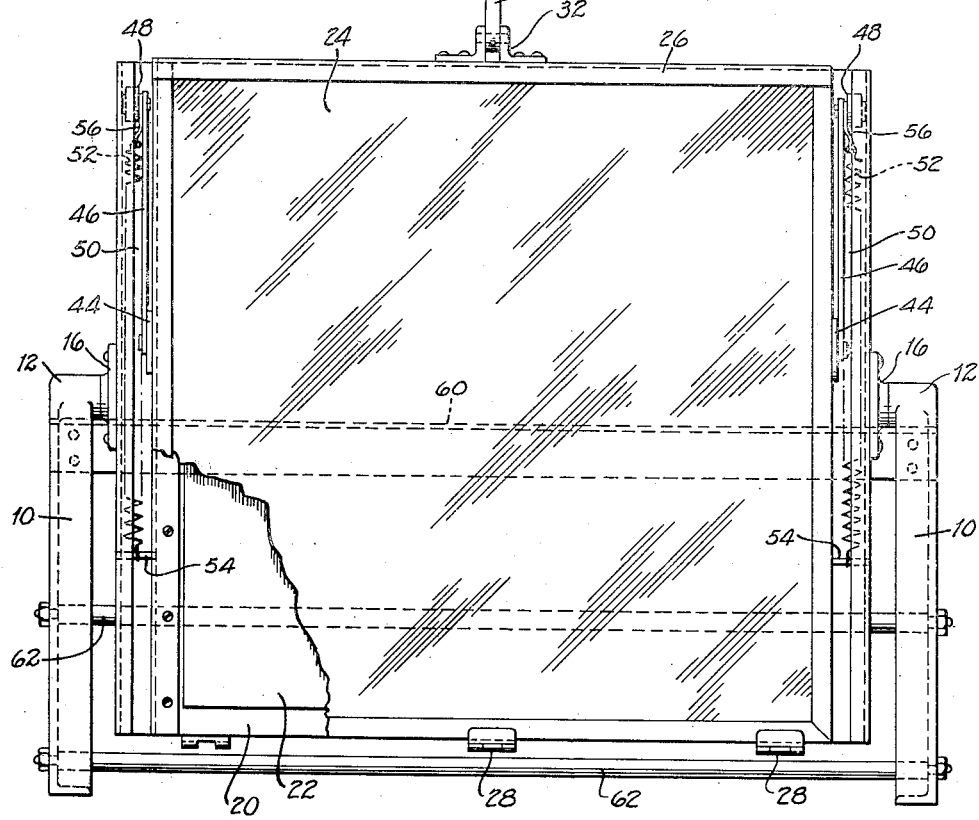
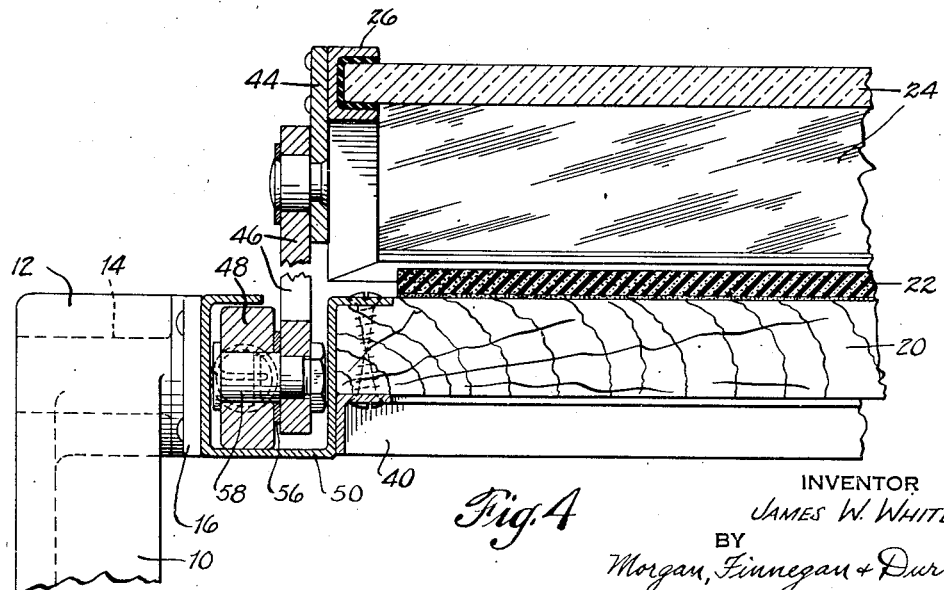

Patented Nov. 8, 1949

2,487,623

UNITED STATES PATENT OFFICE 2,487,623

CAMERA COPY BOARD

James W. White, Roslyn, N. Y., assignor to Powers Photo Engraving Company, Glen Cove, N. Y., a corporation of New York Application January 29, 1947, Serial No. 725,132

3 Claims. (Cl. 88—24)

The present invention relates to copy-boards for photoengraving and other cameras.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 3 is an elevation of the copy-board of the present invention in closed or printing position; and Figure 4 is a fragmentary detailed sectional view taken on the line 4—4 of Figure 1.

Figure 2:
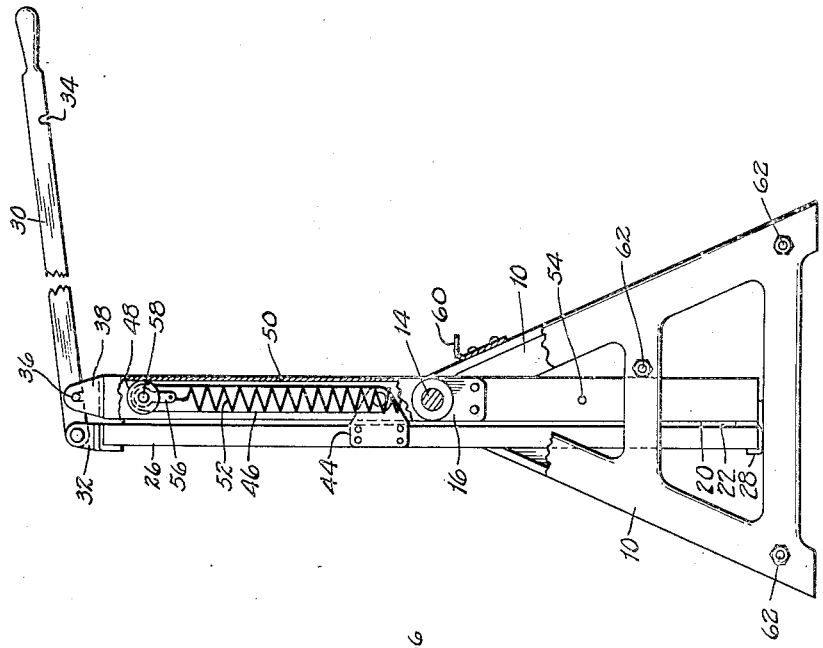
Figure 2 is a similar view with other parts broken away and showing the copy-board in position for copying.

The present invention has for its object the provision of a novel and improved copy-board for holding relatively large copy and which is particularly useful in connection with photoengraving and photomechanical cameras. A further object of the invention is the provision of an improved copy-board which can be easily operated in spite of its relatively heavy construction, and which is conveniently loaded and unloaded, and may be moved from loading to exposure position without danger of the copy changing its position.

Referring now in detail to the present preferred and illustrative embodiment of the invention as shown in the accompanying drawings, supporting frames 10 are provided, one at either end of the structure, each frame being provided with a relatively broad heavy base and a bearing 12 near the upper part of the frame in which is rotatably journalled a pivot shaft 14 projecting laterally from a plate 16 fixed to the side portion of the copy-board. The copy-board itself comprises a rigid flat sheet or baseboard 20 of the desired size covered on one face with a layer 22 of sponge rubber or other suitable resilient material on which the material to be copied is laid when the copy-board is open and in the horizontal position shown in Figure 1. Overlying the copy supporting surface of sponge rubber layer 22 is a flat, transparent glass sheet 24 mounted in a surrounding metal frame 26 which is hinged to one edge of the baseboard 20 by hinges 28 so that the glass frame may be closed tightly against the sponge rubber 22 to smooth and securely hold the sheet to be copied.

Figure 1:
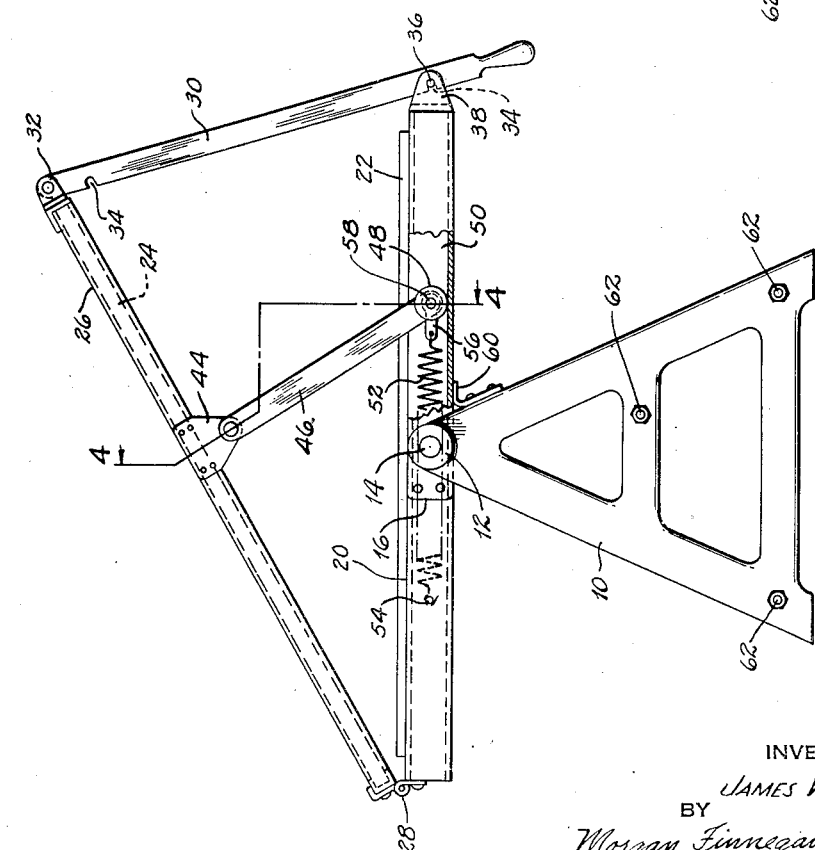
Figure 1 is a side elevation with certain parts broken away showing an illustrative and preferred form of copy-board for use with photoengraving cameras.

Locking means are provided for locking the glass cover plate 24 in copy retaining position or in copy loading position. For this purpose, a bar 30 is pivotally mounted in lug 32 attached to the side of frame 26 opposite the hinges 28, and extends towards the corresponding edge of the baseboard 20. Bar 30 is provided with notches 34 adapted to engage with a pin 36 supported at each of its ends in a bracket 38 fixed to a metal frame 40 surrounding the baseboard 20. As shown in Figure 1 of the drawing, the bar 30 may be latched with one of the notches 34 over the pin 36 to hold the cover glass 24 in raised position, or the cover glass may be lowered, and the other notch 34 in bar 30 may be latched over the pin 36 to lock the glass 24 firmly against the sponge rubber sheet 22 with the copy between the sponge rubber sheet and glass.

Counterbalance means are provided for assisting in raising cover glass 24 and for preventing the cover glass from falling rapidly against the sponge rubber sheet 22, if the bar 30 should slip from the operator's hand, as such a drop might result in breakage of the glass. For these purposes brackets 44 are fastened midway along the opposite sides of metal frame 26, and are pivotally connected to their respective links 46. At the lower end of each link 46 is rotatably mounted a roller 48 which can roll in a snugly fitting guide channel 50 securely fastened to an edge of the baseboard 20, one such guide channel being provided at each of two opposite sides of the baseboard. Guide channel 50 also serves as the support for plates 16 which are preferably so located that the pivot pins 14 are in axial alignment with the center of mass of the frame. Spring means are provided within each channel 50 and are adapted to be extended in tension as the cover glass is moved to copy holding position. As embodied, such spring means comprise a helically coiled spring 52 having one end anchored to a pin 54 on the interior of channel 50, and having its other end attached to a link 56 which is supported on stud 58 serving as the axis of roller 48 so that the pull of spring 52 is applied directly in line with the path of movement of roller 48.

A stop is provided for holding the copy-board in horizontal loading position, and comprises the longitudinally extending bar 60 of angular section which extends from one frame 10 to the other and is riveted thereto in position to be engaged by the underside of channels 50 as the copy-board is moved to horizontal position. Stop means are also provided for holding the copy-board in vertical position, while the material is being copied by the camera, and for this purpose one of the tie rods 62 extending between the two frames 10 is so located that it will be engaged by the back of the channels 50 in the position shown in Figure 2.

The invention in its broader aspects is not limited to the specific mechanisms shown and described but departures may be made therefrom within the scope of the accompanying claims without departing from the principles of the invention and without sacrificing its chief advantages.

What is claimed is:

1. A copy-board for use with photoengraving cameras comprising in combination; a pedestal support having a pair of aligned trunnions and a copy holding unit journalled in said trunnions for limited angular movement between copy-loading and copy-taking positions; said unit comprising a rectangular cover and baseboard hingedly connected for relative angular movement between open and closed positions; a pair of rectangular channel members secured to said baseboard along opposite side margins thereof including aligned pivot shafts journalled in said trunnions; a pair of pivot brackets secured to said cover along margins corresponding to the channel sides of said baseboard; a pair of links having one end thereof connected to said brackets; a roller pivoted on the opposite end of each of said links disposed in said channel members for movement longitudinally thereof; a retractile spring disposed in each of said channel members with one end thereof anchored therein and the opposite end anchored to the roller pivot on said links; a locking handle pivotally connected at one end to said cover provided with a pair of open slots spaced substantially the length thereof; and a rod member secured to said baseboard coactable with said slots for locking said cover in either open or closed position.

2. In a copy-board, the combination with spaced apart supporting frames of a copy-board unit comprising a pair of copy holding members hingedly connected for relative angular movement between open and closed positions, means associated with said supporting frames for permitting a limited rotational movement of said copy-board unit between copy loading and copy taking positions, a pair of channel members secured to one of said copy holding members, a pair of links having fixed pivotable connections to the other of said copy holding members and linearly movable along said channel member, a pair of rollers connected to the movable ends of said links, a pair of retractile springs each connected at one end to an associated channel member and at the other end to the movable end of an associated link, and means for retaining said copy holding members in an open or closed relationship.

3. A copy-board for use with photoengraving cameras comprising in combination, a pair of pedestal supports, a baseboard pivotably connected between said supports, means for limiting the pivotable movement of said baseboard between copy loading and copy taking positions, a cover hingedly connected at one end to said baseboard for permitting the insertion of copy therebetween, a pair of links pivotably connected at one end to brackets on said cover and free at the opposite ends, a pair of channel members secured to said baseboard for guiding the movement of the free ends of said links, a retractile spring associated with each channel member and connected between said channel member and the free end of a link, a handle pivotable about the end of said cover opposite said hinged end and having notches along its surfaces for gripping a rod member secured to said baseboard to provide an open and closed relationship between said baseboard and said cover.

JAMES WM. WHITE.

REFERENCES CITED

The following references are of record in the file of this patent:

UNITED STATES PATENTS

| Number | Name | Date |
|---|---|---|
| 1,834,897 | Caps | Dec. 1, 1931 |
| 2,117,051 | Anderson | May 10, 1938 |
| 2,170,622 | Sussin | Aug. 22, 1939 |